United States Patent [19]

Millar et al.

[11] Patent Number: 5,397,475
[45] Date of Patent: Mar. 14, 1995

[54] PURIFICATION OF HYDROGEN PEROXIDE

[75] Inventors: Malcolm H. Millar; Francis R. F. Hardy; Gareth W. Morris; John R. Crampton, all of Widnes, England

[73] Assignee: Interox Chemicals Limited, London, England

[21] Appl. No.: 30,487

[22] PCT Filed: Oct. 2, 1991

[86] PCT No.: PCT/GB91/01700
§ 371 Date: Apr. 2, 1993
§ 102(e) Date: Apr. 2, 1993

[87] PCT Pub. No.: WO92/06918
PCT Pub. Date: Apr. 30, 1992

[30] Foreign Application Priority Data

Oct. 10, 1990 [GB] United Kingdom ............... 9022003

[51] Int. Cl.⁶ .................................................. B01D 15/04
[52] U.S. Cl. .................................... 210/661; 210/677; 210/263; 423/584
[58] Field of Search ............... 210/661, 677, 681, 688, 210/189, 263, 687; 423/584

[56] References Cited

U.S. PATENT DOCUMENTS

| | | | |
|---|---|---|---|
| 1,671,864 | 5/1928 | Higgins | 210/661 |
| 2,366,007 | 12/1944 | D'Alelio | 210/24 |
| 2,676,923 | 4/1954 | Young | 210/24 |
| 3,074,782 | 1/1963 | Meeker et al. | 23/207 |
| 3,174,927 | 3/1965 | Cross et al. | 210/661 |
| 3,436,343 | 4/1969 | Smith | 210/189 |
| 4,132,762 | 1/1979 | Kim | 423/584 |

FOREIGN PATENT DOCUMENTS 1567646 2/1971 Germany.

OTHER PUBLICATIONS

*Chemical Abstracts*, vol. 69, No. 14, 30 Sep. 1968, (Columbus, Ohio), p. 4990, abstract 53300d, & PL, B, 55378 (Zaklady Elektrochemiczne "Zabkowice").

Primary Examiner—Ivars Cintins
Attorney, Agent, or Firm—Larson and Taylor

[57] ABSTRACT

Purification of aqueous hydrogen peroxide solutions using conventional ion-exchange techniques can result in the hydrogen peroxide decomposing explosively. Much safer processes are obtained by restricting the contact between the resin bed and the hydrogen peroxide solution to a very short contact time, by employing a treatment chamber that is vented to the atmosphere and also by slurrying the resin bed. The bed is conveniently retained on a mesh that acts as a filter (13) preferably conical having an aperture (17) at its apex through which is introduced a small fraction of the solution countercurrent (10) to the main solution flow (9) in order to slurry the bed (19). The solution can be recycled through the same bed or a plurality of beds. Very high purification can be achieved and combined with improved safety of operation.

22 Claims, 1 Drawing Sheet

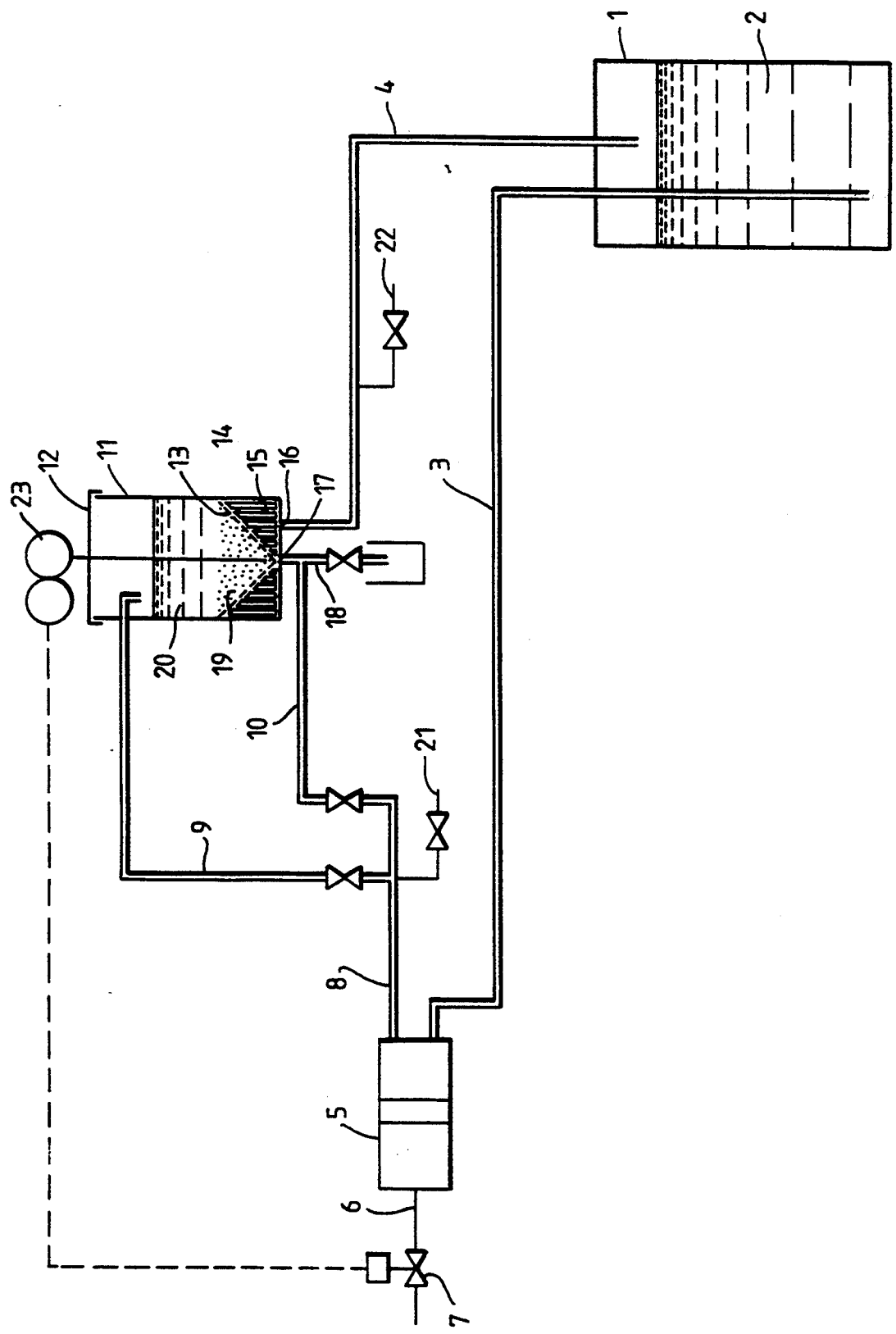

PURIFICATION OF HYDROGEN PEROXIDE

The present invention relates to a process and apparatus for the purification of aqueous hydrogen peroxide solutions and in particular to the removal from solution of ionic metals to very low residual concentrations.

Chemicals for use in the manufacture of semiconductors, integrated circuits and the like and in related electronics industries need to be very pure, otherwise there is a risk that their use will introduce harmful or otherwise undesirable impurities onto or into the semiconductors, integrated circuits and the like, with potentially damaging operational difficulties. The industries are continuing to set ever higher standards of purity, so that products which even 5 to 10 years ago could meet the subsisting standards would no longer do so. Accordingly, there is a continuing need to develop improved purification techniques.

Aqueous hydrogen peroxide solutions are used in cleaning, stripping or etching operations. The existing commercial methods for manufacturing hydrogen peroxide in bulk, such as the hydrolysis of a persulphuric acid and, more commonly, the successive hydrogenation and oxidation of a substituted alkylanthroquinone in a suitable solvent system both produce a product that can contain high levels of impurities including cationic metals and other impurities. Pure grades that are suitable for other uses can be obtained by distillation which effects a partial purification, but the residual concentrations of metals are normally still too high for the product to meet the purity standards of the electronics industries. Accordingly, it is accepted within the industry that alternative or additional purification techniques are required for electronic grade material.

There is one further complication which a prudent manufacturer of an electronic grade hydrogen peroxide solution must take into account. When hydrogen peroxide decomposes, it does so exothermically and accordingly the temperature of its immediate environment is increased. Its rate of decomposition increases as the reaction temperature increases, in conformity with the teaching of Arrhenius. This can result in a self-accelerating reaction, terminating in an explosion. Transition metal ions comprise a principal cause of hydrogen peroxide decomposition and it will be recognised that these ions often represent a significant fraction of the impurities that it is desired to remove from the hydrogen peroxide solution.

It is self-evident that ions may be removed from impure aqueous hydrogen peroxide solutions by passage through a bed of an ion exchange resin, at least in theory. However, the conventional ion-exchange technique of a liquid being passed relatively slowly under pressure through a fixed bed of a solid ion-exchanger results in the metal ions being concentrated on the resin, and in contact with the hydrogen peroxide in a confined space. Such a technique is not only potentially dangerous, but has also resulted in a number of "incidents", namely explosions which destroyed the apparatus and threatened the safety of any process operator that was unfortunate enough to be in the vicinity. It was hypothesised subsequently that the incidents had arisen as a result of the metal ions catalysing localised peroxide decomposition, which led to a localised self-accelerating reaction, followed by decomposition which then spread to the remainder of the liquid phase.

It has been suggested by Wako Junyaku Kogyo in Japanese Patent Application Kokai 62-187103 that safety could be improved by pretreating the resin in a certain manner, but safety is such an important matter that it remains of great benefit to devise alternative or complementary operating procedures and apparatus. Accordingly, it was an object of the present programme of research into purification processes to devise processes and apparatus for purifying hydrogen peroxide solutions in which the risk of plant destruction was either eliminated or at least significantly reduced.

One comparatively safe purification technique has been described by Interox Chemicals in PCT application no PCT/GB 90/00522, which circumvents the problem identified above by avoiding at least initially the use of an ion exchange resin and instead adsorbs the impurities on a dispersion of fine particles of stannic oxide and then separates the solids from the solution by filtration. This technique has been found to be especially good at removing some ions and not quite so good at removing other ions. In consequence, it would be desirable to locate an alternative and/or complementary process for purifying hydrogen peroxide solutions that uses an ion exchanger, but one which can be operated without undue risk of plant destruction.

According to a first aspect of the present invention there is provided a process for purifying an aqueous hydrogen peroxide solution in which the solution is brought into contact with an ion exchange resin in acid form, maintained in contact with the resin until at least a fraction of the metal ions have been exchanged for hydrogen or other ions and thereafter separated, characterised in that the resin is employed in particulate form in a shallow bed and the contact period of the solution during its passage through the bed is short and typically not more than a few seconds.

The present invention can drastically improve the safety in the use of resins for purifying hydrogen peroxide solutions by breaking the chain that begins with localised decomposition and ends with an explosion, or at least reducing significantly the likelihood of subsequent propagation of localised decomposition. It is believed that the conditions selected for the operation of a process according to the first aspect substantially reduce or eliminate the risk of localised decomposition causing a significant increase in the temperature of the solution in the vicinity of the resin. In consequence, the invention reduces the likelihood of the decomposition spreading outside its immediate locality. In consequence, it is able to combine the capability of resins to remove ions with increased safety of operation. None the less, it will be understood that the present invention is not dependent upon the accuracy of any belief, theory or explanation given herein.

According to a second aspect of the present invention, there is provided a process for purifying an aqueous hydrogen peroxide solution in which the solution is brought into contact with an ion exchange resin in acid form, maintained in contact with the resin until at least a fraction of the metal ions have been exchanged for hydrogen or other ions and thereafter separated, characterised in that the resin is employed in the form of a slurried bed of particles during the passage therethrough of the solution.

By providing the bed in a slurried form, the bed is loosely packed and the particles are to at least some extent in suspension. Accordingly, the flow of the solution past the particulate ion-exchange resin is facilitated, thereby, it is believed contributing to the short residence time of solution in the bed and enhancing the rate and extent of dissipation by dispersal of any heat that is generated by localised decomposition of hydrogen peroxide.

It is preferred to employ a process that satisfies simultaneously both the first and the second aspects of the present invention.

It is convenient to permit the solution, or at least a substantial fraction thereof, to pass downwardly through the bed of ion exchange material, and preferably under the influence of gravity by providing a body of solution above the bed. In particularly favoured embodiments, the head of solution is maintained approximately constant and at such a height that the passage of solution through the bed occurs at a desired rate.

In the terminology employed in ion exchange treatments, throughput is often expressed as the number of bed volumes of liquid per hour. Conventional treatments employ a rate of from 5 to 20 bed volumes per hour. In the present invention, it is convenient to employ a different order of magnitude of throughput. Effective results have been achieved at a throughput rate of over 200 bed volumes/hour and especially in the range of about 500 to 2,500 bed volumes/hour. By employing such a high throughput, the contact time of the hydrogen peroxide with the resin bed during its passage therethrough is short and is typically measured in seconds. The practical upper limit of the throughput will normally take into account the actual depth of the bed, the packing of particles in the bed, resistance of the bed support to the passage of fluid and the resistance of the ion exchange material to abrasion and the fact that there is an inverse relationship between the bed depth and the proportion of exchangeable ions that are removed from solution during its passage through the bed. It is usual for the rate to be selected at less than 10,000 bed volumes/hour.

The throughput varies inversely with the bed depth and directly with the flow rate of solution through the bed, the latter being dependent on the solution head and inversely with the bed depth. A similar throughput can be attained at different bed depths by adjusting ratio of head to bed depth in accordance with the foregoing principles. In many practical embodiments, the linear ratio of the solution head to bed depth is selected in the range of from 5:1 to 50:1.

Both the bed depth and the head of liquid employed in the present invention may be selected within wide ranges. The liquid head is normally not more than 2 m and the bed depth is normally not more than 0.5 m. The desired scale of operation will often dictate the actual dimensions employed. We have found that at one convenient scale of operation, the bed depth is selected within the range of from 0.01 m to 0.25 m and the head of solution above the bed for convenience is often selected correspondingly within the range of from 0.1 m to 2 m. The bed may be of uniform depth, but when a non-uniform depth is employed, such as a hemispherical, conical or frusto-conical shape, the term bed depth herein implies its average depth.

In practice, it has been found after a single passage through the bed, conducted in accordance with the first aspect of the invention, that even though the treatment has been effective in that it has removed a substantial fraction of those cations, hydrogen peroxide solution can still contain a significant concentration of extractable cations. Consequently, in preferred embodiments according to the present invention, the solution is passed through the bed more than once, and particularly three or more times. The maximum number of passes is at the discretion of the user and depends at least in part and in self-evident fashion upon the amount of time and expense which the user is willing to devote to the purification process, the throughput rate selected, the level of impurities in the solution before purification began, and the purity limits that he is seeking to meet. The number of passes is often no more than 25, but that is not a mandatory upper limit. A convenient number of passes is often to be found within the range of 5 to 12.

One further measure which can be employed comprises the total of the contact times for the solution during its passages through the bed or beds of ion exchange material. Desirably, the said contact time in total is selected in the range of from 5 to 75 seconds, and in many suitable embodiments the total falls within the range of 10 to 35 seconds.

It will be recognised that if the hydrogen peroxide solution is subjected to a plurality of passes through a bed of ion exchange resin, each pass may be conducted in the same manner or the manner can be varied, though remaining in accordance within the broad definitions of the present invention. The same bed of ion exchange material can be employed for each pass, or at least part of the bed can be replaced by fresh material, depending upon the extent to which the ion-exchange capacity of the material has been exhausted, and the safety margin which it is desired to retain. In a particularly safe mode of operation, the ion exchange material is discarded after it has exchanged no more than about 20% of its theoretical capacity. The purified hydrogen peroxide solution after passage through the bed can be returned to the reservoir from which it had been withdrawn or to second reservoir. In batch processing, recycle to the same reservoir is preferable from some viewpoints, in that the solution in the reservoir represents an averaged composition at all times, so that the processing can be terminated at any time without waiting for the remainder of a batch to be treated, for example when analysis indicates that a desired level of purification has been attained. The present invention also includes embodiments in which the same hydrogen peroxide solution is passed through a plurality of beds, which naturally may each be the same or different. It is at the discretion of the processor whether the solution is passed through a plurality of beds in series before being returned to a holding reservoir or is passed through a number of beds arranged in parallel. The two arrangement are not mutually exclusive. A somewhat similar, though not necessarily identical, extent of purification can be achieved with the same number of passes arranged in different manners. In series processing or processes in which the solution is recycled through one bed to a holding reservoir, it is potentially advantageous for the solution to encounter increasingly fresh ion exchange resin at each successive passage. In embodiments operated in that way, the least purified solution encounters the resin having least unused capacity and progressively, as the solution is purified, it encounters resin of higher unused capacity until in the last pass the most purified solution encounters fresh resin.

The amount of ion exchange material to employ per unit volume of solution to be purified is to at least some extent at the discretion of the user, provided always that the theoretical ion exchange capacity of the material is greater than the amount of exchangeable cations in the solution and preferably is much greater. As a general guidance, the overall processing time for a unit volume of solution tends to vary inversely with the relative amount of ion exchange material, assuming the use of the same bed depth. Of course, any such general statement is modified to the extent that multiple passes through beds of material are conducted simultaneously and to the extent that the material is reused. In the light of the foregoing, it is often convenient to employ a volume ratio of resin to hydrogen peroxide solution within the range of from 1:200 to 1:4000.

In processes operated according to the second aspect of the invention employing a slurried bed, the packing of the bed of ion exchange particles is loose, that is to say, the particles are not compressed together in constant contact, but some and indeed usually many of the particles are separated by liquid phase. This can alternatively be considered as suspension of those particles. The term slurried bed as used herein includes both a spouted bed and a fluidised bed. The slurried bed has an apparent depth that is greater than a packed bed would have been under otherwise the same operating conditions. The bed expansion tends to vary according to whether the bed is spouted or fluidised, typically from about 5 to 20% v/v for the former and about 20 to 100% for the latter.

The slurrying of the bed can be obtained by directing a stream of an inert fluid into the bed, transversely to or preferably countercurrent to the direction of the main or sole flow of the hydrogen peroxide solution. Although this fluid could comprise a non-reactive gas, such as nitrogen, the slurrying effect can be achieved more elegantly by employing a fraction of the hydrogen peroxide solution. In many embodiments, the principal flow of peroxide solution is downwardly through the resin bed and the counter-flow of the bed for slurrying purposes is accordingly upward. The bed expansion depends in part in an inverse relationship to the volume ratio between the main flow and the slurrying stream and in part upon the manner of distribution of the slurrying stream.

For spouted bed operation, the slurrying stream is preferably introduced at a single point in the central region of the bed and conveniently an effective proportion comprises from about 5 to 20% of the overall flow of solution into and through the resin. As the beds attain a larger diameter, two or more points of introduction of the slurrying stream becomes more attractive, preferably arranged in a geometric array.

For fluidised bed operation, the slurrying stream is preferably introduced through a multiplicity of inlets arranged across substantially all the base of the bed. In fluidised bed operation, the slurrying stream may comprise at least 20% of the total flow of solution through the bed, and may even extend to 100%.

In accordance with preferred embodiments of the present invention, the bed of ion-exchange material is housed in a container that is vented to the atmosphere. Preferably, the container has a splash cover which rests on the side walls and would be blown off without resistance in the event, however unlikely, of an "incident". By venting the ion exchanging chamber to atmosphere, pressure is released very readily and accordingly with a much lower force than if a closed conventional ion exchange apparatus were used.

The base of the container preferably comprises a filter, on its inward surface such as a mesh that is fine enough to retain within the chamber the particulate ion exchange material, but through which the solution is permitted to pass out of the chamber. The mesh is suitably supported on a block which is transpierced by vertical channels for example obtained by drilling to allow passage of the treated solution. These channels lead to a collection zone at the base of the vessel. The inward surface of the filter is preferably inclined, particularly for use in a spouted bed mode of operation, but is often level for fluidised bed operation.

In a number of particularly preferred embodiments, said base inner surface is hemispherical or especially is conical, and has an inlet at or adjacent to its lowest point through which the counter current of solution can be pumped. It will be recognised that the ion exchange material is placed in the hemisphere or cone defined by the mesh and can most readily be suspended or the bed loosened by the upflow of solution through said inlet. A cone angle selected in the range of from about 50° to about 125° has been found to be practical.

It will be understood that the inlet can also function as an outlet for ion exchange material, preferably being flushed through using purified liquid, such as water or hydrogen peroxide solution. Where the inlet serves a dual function, the line thereto includes a T piece or similar junction and appropriate control valves to permit ingress of or to halt the solution and to permit or prevent egress of the bed material. The use of a conical base and single inlet avoid undue complications and accordingly is advantageous in that it can be implemented relatively easily. Other possibly more complicated arrangements can be contemplated, such as the provision of a plurality of inlets for a counter-current flow of solution, the inlets being distributed in the side wall or base of the chamber, each possibly located at the apex of a conical or like zone.

The apparatus is most desirably constructed from substances that are compatible with aqueous hydrogen peroxide, possibly after appropriate pretreatments designed to minimise the release of impurities into solution during use. Thus, pipelines containers, valves, pumps etc or at least the surfaces likely to encounter the peroxide solution are preferably made from the appropriate grades of PTFE (polytetrafluoroethylene), PVDF (polyvinylidenefluoride) or polyethylene.

The ion exchange resin material that is suitable for use in processes according to the present invention comprises material that is compatible with hydrogen peroxide solutions. Materials that are inherently incompatible should not be used. Potentially interesting resins can be tested for compatibility in an empirical test by contacting 1 g of the material with 100 ml of distilled hydrogen peroxide (35% w/w) at a temperature of 25° C. and monitoring the volume of gas that is produced during storage. The difference between the test solution and a control conducted at the same time in identical apparatus, but in the absence of the material demonstrates whether or not the material is sufficiently compatible. A difference of no more than about 20% of the gas evolution from the control solution indicates that the material is sufficiently compatible.

Whilst the invention process and apparatus is capable of exchanging into solution any cation that is loaded on the resin, the primary intention is to exchange hydrogen ions into solution for metal, especially transition metal or alkaline cations that were present in the impure solution, and thereby effect purification. The ion exchange material is particularly suitably a strong cation exchange resin. In such resins, the resin preferably contains pendant sulphonic acid groups and comprises particularly cross-linked polystyrene. A number of suitable resins are available commercially, for example one or more of the products available from Rohm and Hass under their trade mark "Amberlite" which is registered in some countries. At least some of the cation exchange resins that are particularly suitable for use in the present invention have particles of a higher density than the hydrogen peroxide solution and which thereby tend to sink under the influence of gravity when present therein. Such particulate resins are especially suited for making a spouted bed of resin by an upflow of at least a fraction of the hydrogen peroxide feedstock.

It can be desirable to pretreat crosslinked polystyrene resins before their use in a process according to the present invention. In one such desirable pretreatment, the said resin is contacted with an aqueous medium until it is at least substantially fully hydrated. In the same or a further desirable pretreatment, the said resin is contacted with an aqueous solution of a strong mineral acid such as hydrochloric acid so as to thereby ensure that it is in the hydrogen form and thereafter water washed to remove residual chloride anions, preferably to an effluent pH of about pH5. In a further or alternative pretreatment the solution comprises aqueous hydrogen peroxide. Naturally, contamination can be minimised or avoided by the use of electronic grade chemicals in the pretreatments.

In further embodiments according to the present invention, the processes and apparatus may be used in conjunction with a peroxide-compatible resin that is capable of removing carbon from solution. The treatment can comprise one or more passages of the solution through a bed, preferably a slurried bed of such a resin alone or as one component of a mixture with a compatible cation exchange resin. It is considered preferable to delay use of a carbon-removing resin until the solution is relatively pure, for example until further treatment with the cation exchange resin causes no significant improvement in purification or an arbitrary limit for a representative metal ion is passed, such as 1 ppb iron. In the event that properly compatible anion exchange resins are located, then such materials may also be employed in a process according to the present invention, and thereby complement the metal ion removal effected by the aforementioned cation exchangers. In this context, reference is made to the technique of pre-treating anion exchange resins with a bicarbonate described in U.S. Pat. No. 3 294 488 (Dunlop et al) in order to avoid the introduction of other acid impurities into the treated solution in contrast to the use of other salt forms of the acid which introduce an equivalent of acid for each equivalent removed.

A process according to the present invention can also be employed, usually in conjunction with one or more prior purifying processes, so as to form a particularly effective regime for producing ultra pure hydrogen peroxide solutions. Thus, in such a regime the hydrogen peroxide solution feedstock to the invention apparatus will normally have already been partially purified by distillation, possibly employing a glass still or even double distillation, the two distillations being separated by dilution with electronic grade water. Optionally, either alternatively or additionally to a distillation process, the hydrogen peroxide feedstock may have been pretreated by contact with a dispersion of particulate stannic oxide as described for example in International Application no PCT/GB 90/00522, the description on page 4 lines 17 to page 8 line 24 therein being incorporated herein by reference.

The hydrogen peroxide solution feedstock for purification by a process according to the present invention can be either dilute or concentrated. It normally has a concentration of at least 5% w/w, is usually not greater than 50% w/w and can very conveniently be between 30 and 40% w/w.

One embodiment of the present invention will now be described more fully by way of example and with reference to the accompanying FIGURE which is a schematic representation.

A reservoir 1 containing a batch of aqueous hydrogen peroxide solution 2 is provided with a suction line 3 extending from below the solution level and a solution return line 4 terminating above the solution level. Line 3 feeds into a double diaphragm pump 5 that has an air inlet line 6 provided with an solenoid controlled valve 7. A discharge line 8 from the pump 5 is split into a main supply line 9 and a back-flushing line 10 that both feed into a cylindrical treatment vessel 11. Vessel 11 has a loose fitting cover 12 and is equipped near its base with a fine mesh conical filter 13. Filter 13 is supported on a collar 14 that is transpierced by vertical channels 15 leading to a solution collection zone 16 connected to the solution return line 4. Filter 13 at its apex is penetrated by an aperture 17 connected to back flushing line 10 and to solids discharge line 18. Vessel 11 contains particulate ion exchange resin 19 in the zone above the conical filter 13 and a head of hydrogen peroxide solution 20. Lines 4 and 8 have sampling points 21 and 22. Vessel 11 is supplied with a temperature monitor 23 linked to the shut-off solenoid valve 7 in the air supply line 6. The apparatus also is provided with drain lines (not illustrated) to permit draining of the solution in the event of power loss.

The apparatus was constructed from electronic grade materials; PTFE for the solution lines 3, 4, 8, 9 and 10, mesh filter 13, support collar 14 and any valve or pump surface that encounters hydrogen peroxide solution during operation of the apparatus; PVDF for treatment vessel 11 and polyethylene for reservoir 1.

In Operation, vessel 13 is charged with ion exchange resin 19. Hydrogen peroxide solution 2 in reservoir 1 is withdrawn through line 3 and pumped by pump 5 through lines 8, 9 and 10 into treatment vessel 11. The flow of solution is adjusted such that approximately 90% flows through line 9 to the head of vessel 11 and about 10% by volume is back flushed into the base of vessel 11 through line 10 and aperture 17 at the apex of the conical filter 13. The flow of solution into vessel 11 creates a head of solution 20 which causes the solution to pass under the influence of gravity through the ion exchange bed 19, conical filter 13, channels 15, and collection zone 16 into return line 4. The solution back flushing through central aperture 17 creates a spouted bed by carrying upwardly a proportion of the resin particles in the central area of bed 19. The particles thereafter gravitate towards and slide down the inward face of the conical filter until they return to the central area, thereby completing a circuit. The solution flows under gravity through the return line 4 to the reservoir 1 and mixes with the remainder of the solution, thereby averaging the extent of purification of the solution.

The solution is recycled through the apparatus until the desired degree of purification has been effected. This can be either when analysis of a sample taken at sample point 21 indicates that impurity levels in the solution prior to its subsequent contact with the bed of ion exchange resin 19 have been reduced to an acceptable level or when samples taken from sample points 21 and 22, i.e. before and after contact with the resin bed 19, are essentially the same, indicating that the system has attained an equilibrium level. Thereafter, discharge line 18 is opened and the resin bed 19 is discharged under gravity through aperture 17, preferably assisted by the introduction of electronic grade water or hydrogen peroxide solution introduced into vessel 11.

In one variation, the vessel 11 is recharged with fresh resin, which may be the same type as before or be different, and solution is recycled in the same way as described above.

In Example 1, the apparatus described above and illustrated by the Figure was employed to purify at ambient temperature a grade of 35% w/w hydrogen peroxide that had been double distilled, the second distillation being effected in a glass vessel. Analysis of the distilled solution by GFAAS (graphite furnace atomic absorption spectrophotometry) after solution preconcentration gave the following concentrations by weight expressed as parts per billion (109), being the average of four determinations. Na 1.46 ppb; Fe 1.34 ppb; Ca 3.36 ppb; Zn 0.32 ppb; Al 0.95 ppb. 150 liters of the starting solution were recycled for 2 hours at a flow rate of 500 l/hr through a bed of 0.4 l of an ion exchange resin available commercially from Rohm and Hass under the trade mark "Amberlite" grade 200 CH which had been pretreated by washing it with about 10 times its volume of electronic grade aqueous hydrogen peroxide solution (35% w/w). The resin caused no detectable increase in gas evolution in the empirical test for resin/peroxide compatability described hereinbefore.

The purified solution when analysed in same way contained Na 0.26 ppb; Fe 0.61 ppb; Ca 1.15 ppb; Zn 0.08 ppb; Al <0.6 ppb.

Monitoring of the temperature in the resin bed showed that it remained steady at ambient temperature, confirming that the purification had been carried out with absolute safety, since any significant decomposition that could have led to an incident would first have appeared as a detectable rise in temperature.

An examination of these results show that the purification was not only carried out with great safety, but also had resulted in the impurity levels analysed in the product solution having all been reduced to a value that was close to and in several instances substantially below 1 ppb.

In Example 2, Example 1 was repeated, but employing as feed hydrogen peroxide an aqueous hydrogen peroxide solution (35% w/w) that had been distilled in a metal still. The Zn and Al impurity concentrations measured by ICP-MS (inductively coupled plasma mass spectrometry) and the remainder by atomic absorption spectrometry, using an average of two determinations, were as follows:-Na 23.7 ppb; Fe 11.1 ppb; Ca 6.4 ppb; Zn 15.0 ppb; Al 43.4 ppb. Analysis of the product by GFAAS, as in Example 1, yielded the following results:-Na 0.23 ppb; Fe 0.28 ppb; Ca 0.40 ppb; Zn 0.19 ppb; Al 0.6 ppb.

As in Example 1, no temperature rise in the bed at any time was detected during operation. It will be observed that once again the residual level of the analysed impurities had been reduced very substantially, and in this Example all the impurities had been lowered to substantially below 1 ppb.

In Example 3, Example 1 was repeated, but employing as feedstock an aqueous hydrogen peroxide solution (35% w/w) which contained impurity levels of Na 8.2 ppb; Fe 0.5 ppb; Ca 6.5 ppb; Zn 10.5 ppb; Al 4.6 ppb. The feedstock was recycled through the bed until it has passed through, on average, three times, three turnovers. The bed was then replaced with a second charge of the resin and the feedstock passed through for a further three turnovers and the procedure was repeated using a third charge of the resin. The purified solution contained after the first, second and thirds stages of treatment respectively Na 2.4, 0.8, 0.2 ppb; Fe 0.5, 0.2, 0.3 ppb; Ca 1.2, 0.4, 0.3 ppb; Zn 2.0, 0.8, 0.2 ppb; Al 1.6, 0.8, 0.5 ppb. Example 3 demonstrates that successive treatments can lower the impurity concentrations progressively.

EXAMPLE 4

In this Example, the general procedure of Example 1 was followed, but employing a bed of 625 ml of an ion exchange resin available under the Trade Name Bio-Rad AG-50 W-XS. The impurity concentrations of the feedstock and the solution after 3 and 6 turnovers are indicated below in ppb.

|  | Na | Fe | Ca | Zn | Al |
|---|---|---|---|---|---|
| Feedstock | 9.7 | 1.7 | 8.4 | 10.1 | 2.2 |
| 3 turnovers | 2.2 | 1.0 | 2.7 | 2.3 | 0.7 |
| 6 turnovers | 0.5 | 0.7 | 0.6 | 0.9 | 0.5 |

Example 4 confirms that the impurity levels in the hydrogen peroxide are progressively removed as the solution is recirculated through the resin bed.

We claim:

1. In a process for purifying an aqueous metal ion-containing hydrogen peroxide solution which comprises contacting said solution with an ion exchange resin in acid form until at least a fraction of the metal ions have been exchanged for hydrogen ions, and thereafter separating the ion exchange resin and solution, the improvement wherein the resin is employed in the form of a shallow slurried bed of ion exchange particles and wherein said contacting is effected by passing said solution through said bed at a rate of at least 200 bed volumes per hour.

2. A process according to claim 1 wherein the solution is passed through the bed at a rate of at least 500 bed volumes per hour.

3. A process according to claim 1 wherein the solution flows through the resin bed under gravity.

4. A process according to claim 1 wherein the linear ratio of head of solution to bed depth is selected within the range of from 5:1 to 50:1.

5. A process according to claim 1 wherein the total contact time between the resin and the solution is within the range of from 5 to 75 seconds.

6. A process according to claim 1 wherein the solution is passed through the resin and/or a different resin a plurality of times.

7. A process according to claim 6 further comprising the step of changing said bed after each passage of said solution through said bed.

8. A process according to claim 6 wherein said solution is passed through said resin bed from 5 to 12 times.

9. A process according to claim 1 wherein the resin particles are fluidised by an upward stream of at least part of the hydrogen peroxide solution.

10. A process according to claim 9 wherein a fluidised bed of said particles is created by an upward stream of at least part of the hydrogen peroxide solution concentrated at a central zone of the bed.

11. A process according to claim 10 wherein the bed is retained within an inclined sidewall.

12. A process according to claim 11 wherein the sidewall comprises a mesh filter that defines a downward pointing cone.

13. A process according to claim 1 wherein the resin employed comprises a cross linked polystyrene resin bearing pendant sulphonic acid groups.

14. Apparatus for purifying an aqueous metal ion-containing hydrogen peroxide solution comprising:
   a vessel containing a bed of ion exchange resin particles in acid form;
   a reservoir of metal ion-containing aqueous hydrogen peroxide solution;
   means for passing a fluid upwardly through said resin bed to slurry the ion exchange resin particles in the form of a shallow slurried bed of said particles;
   means for passing hydrogen peroxide solution from said reservoir through said shallow slurried bed of ion exchange resin particles at a rate of at least 200 bed volumes per hour to effect contact of said hydrogen peroxide solution with said ion exchange particles in said shallow slurried bed to exchange at least a fraction of the metal ions with hydrogen ions; and
   outlet means for the passage of purified hydrogen peroxide solution from said vessel after the solution has passed through said shallow slurried ion exchange resin bed.

15. Apparatus according to claim 14 further comprising means for maintaining a body of said hydrogen peroxide solution above said slurried resin bed, the head of said body of said solution being sufficient to enable the solution to pass downwardly through said shallow slurried resin bed solely under the influence of gravity.

16. Apparatus according to claim 14 wherein said vessel comprises an inclined filter surface sidewall retaining said resin bed.

17. Apparatus according to claim 16 wherein the sidewall forms an inverted cone.

18. Apparatus according to claim 17 wherein said inverted cone has a cone angle of from 50° to 125°.

19. Apparatus according to claim 16 wherein the sidewall has an aperture at or adjacent to the base of the incline, said aperture being an inlet for upward introduction of the slurrying fluid.

20. Apparatus according to claim 14 wherein said fluid passing means comprises means for passing aqueous hydrogen peroxide solution from said reservoir upwardly through said resin bed.

21. Apparatus according to claim 14 further comprising closeable outlet means for discharging said resin particles from said vessel.

22. Apparatus according to claim 14 further comprising means for conveying the purified aqueous hydrogen peroxide solution from said outlet means to said reservoir.

* * * * *